(12) United States Patent
Dürr et al.

(10) Patent No.: US 7,804,041 B2
(45) Date of Patent: Sep. 28, 2010

(54) LASER DEVICE FOR DRILLING HOLES IN COMPONENTS OF A FLUID INJECTION DEVICE

(75) Inventors: Ulrich Dürr, Allmendingen (CH); Bruno Frei, Thierachern (CH)

(73) Assignee: Lasag AG, Thun (CH)

( * ) Notice: Subject to any disclaimer, the term of this patent is extended or adjusted under 35 U.S.C. 154(b) by 882 days.

(21) Appl. No.: 10/550,536

(22) PCT Filed: Mar. 9, 2004

(86) PCT No.: PCT/EP2004/002408

§ 371 (c)(1), (2), (4) Date: Sep. 22, 2005

(87) PCT Pub. No.: WO2004/085109

PCT Pub. Date: Oct. 7, 2004

(65) Prior Publication Data

US 2007/0000877 A1    Jan. 4, 2007

(30) Foreign Application Priority Data

Mar. 26, 2003 (EP) .................. 03006697

(51) Int. Cl.
B23K 26/38 (2006.01)
H01S 3/10 (2006.01)

(52) U.S. Cl. ................ 219/121.6; 219/121.7

(58) Field of Classification Search ................
219/121.67–121.72, 121.61; 372/22, 25, 372/28
See application file for complete search history.

(56) References Cited

U.S. PATENT DOCUMENTS

| 3,904,987 | A | * | 9/1975 | Cheng .................... 372/13 |
| 4,114,018 | A | * | 9/1978 | Von Allmen et al. ... 219/121.69 |
| 4,227,159 | A | * | 10/1980 | Barrett et al. .............. 372/70 |
| 4,399,529 | A | * | 8/1983 | Leterme et al. ......... 369/112.17 |
| 4,581,515 | A | * | 4/1986 | Egashira ............... 219/121.72 |
| 4,959,119 | A | * | 9/1990 | Lantzer ..................... 216/65 |
| 5,121,398 | A | * | 6/1992 | Rao ......................... 372/20 |
| 5,151,909 | A | * | 9/1992 | Davenport et al. ........... 372/22 |
| 5,173,918 | A | * | 12/1992 | Townsend et al. ........... 372/95 |
| 5,377,212 | A | * | 12/1994 | Tatsuno et al. ............. 372/22 |

(Continued)

FOREIGN PATENT DOCUMENTS

JP    02000150999 A  *  5/2000

OTHER PUBLICATIONS

International Search Report completed May 19, 2004 and mailed Jun. 15, 2004 in corresponding International Application No. PCT/EP2004/002408.

(Continued)

*Primary Examiner*—Samuel M Heinrich
(74) *Attorney, Agent, or Firm*—Griffin & Szipl, P.C.

(57) ABSTRACT

The laser machining device is provided for drilling holes in components of a fluid injection device, particularly for injecting fuel into a combustion engine. The laser resonator is formed by an optically pumped diode laser solid state active medium. The resonator is arranged for supplying primary pulses in the microsecond range. Modulation means are arranged between the resonator and a machining head for modulating the amplitude of the primary pulses supplied by the resonator, so as to obtain a secondary pulse train of smaller length for each of said pulses.

18 Claims, 2 Drawing Sheets

U.S. PATENT DOCUMENTS

| | | | |
|---|---|---|---|
| 5,381,437 A * | 1/1995 | Kuwabara et al. | 372/98 |
| 5,742,634 A * | 4/1998 | Rieger et al. | 372/25 |
| 5,828,683 A * | 10/1998 | Freitas | 372/36 |
| 5,943,351 A * | 8/1999 | Zhou et al. | 372/22 |
| 5,963,575 A * | 10/1999 | Muller et al. | 372/92 |
| 6,047,011 A * | 4/2000 | Cook | 372/22 |
| 6,091,749 A * | 7/2000 | Hoffmaster et al. | 372/38.02 |
| 6,130,900 A * | 10/2000 | Black et al. | 372/25 |
| 6,285,002 B1 * | 9/2001 | Ngoi et al. | 219/121.73 |
| 6,331,993 B1 * | 12/2001 | Brown | 372/55 |
| 6,366,596 B1 * | 4/2002 | Yin et al. | 372/92 |
| 6,393,034 B1 * | 5/2002 | Konno et al. | 372/10 |
| 6,414,980 B1 * | 7/2002 | Wang et al. | 372/92 |
| 6,418,154 B1 * | 7/2002 | Kneip et al. | 372/25 |
| 6,449,294 B1 * | 9/2002 | Boutoussov | 372/25 |
| 6,539,035 B1 * | 3/2003 | Yoda et al. | 372/6 |
| 6,541,731 B2 * | 4/2003 | Mead et al. | 219/121.7 |
| 6,654,391 B2 * | 11/2003 | Adams | 372/10 |
| 6,664,498 B2 * | 12/2003 | Forsman et al. | 219/121.6 |
| 6,683,893 B2 * | 1/2004 | Wang | 372/10 |
| 6,782,016 B2 * | 8/2004 | Braiman et al. | 372/26 |
| 6,784,399 B2 * | 8/2004 | Dunsky et al. | 219/121.68 |
| 7,113,533 B2 * | 9/2006 | Leyrer et al. | 372/53 |
| 7,149,231 B2 * | 12/2006 | Afzal et al. | 372/10 |
| 7,316,067 B2 * | 1/2008 | Blakey | 29/896.6 |
| 7,456,372 B2 * | 11/2008 | Hiramatsu | 219/121.7 |
| 2002/0000426 A1 | 1/2002 | Mead et al. | |
| 2002/0009843 A1 * | 1/2002 | Kyusho et al. | 438/200 |
| 2003/0069617 A1 * | 4/2003 | Boutoussov et al. | 607/89 |
| 2005/0254533 A1 * | 11/2005 | Hollemann et al. | 372/25 |
| 2006/0256693 A1 * | 11/2006 | Knittel et al. | 369/112.01 |

OTHER PUBLICATIONS

"Pockel Cells," Diracdelta.co.uk, Science and Engineering Encyclopedia Version 2.3, copyright 2001-2009, printed from www.diracdelta.co.uk/science/source/o/o/pockels%20cell/sour . . . on Jul. 16, 2009.

* cited by examiner

LASER DEVICE FOR DRILLING HOLES IN COMPONENTS OF A FLUID INJECTION DEVICE

This is a National Phase Application in the United States of International Patent Application No. PCT/EP2004/002408 filed Sep. 3, 2004, which claims priority on European Patent Application No. 03006697.1, filed Mar. 26, 2003. The entire disclosures of the above patent applications are hereby incorporated by reference.

FIELD OF THE INVENTION

The present invention concerns a laser machining device for drilling holes in components of a fluid injection device, in particular for injecting fuel into a combustion engine. "Combustion engine" means any type of engine or reactor in which a fuel is supplied directly or indirectly to at least one combustion chamber via an injection device. "Injection device component" means in particular injection nozzles, flow controllers or even filters.

BACKGROUND OF THE INVENTION

Currently, various methods are known for drilling holes in the aforementioned components, particularly the use of certain laser devices. For example, the use of diode pumped solid state lasers (DPSSL), arranged with Q switch means for the resonator, has been proposed. Such lasers generate a plurality of pulses whose very short period is generally much less than 1 µs, for example 15 nanoseconds.

A laser device of the aforementioned type has already been made by various companies. The user of such a diode pumped crystal laser has numerous advantages relative to a flash lamp pumped crystal laser, for example an Nd:YAG laser. Indeed, the use of such a flash lamp generates variations from one pulse to another, particularly a fluctuation in the intensity of the pulses supplied and a variation in the leading edge length of the pulses. Moreover, the resonator's stability is not very good, in particular because the active element is heated by the flash lamp which has a relatively broad transmission spectrum. The laser thus does not have optimum yield since a part of the energy is not used for generating the laser beam. This also means that the active medium is subjected to thermal stresses which decrease the pulse transmission stability and quality. The major drawbacks of this are that the precision of the holes to be machined is limited and it is not possible to achieve good reproducibility from one hole to the next. Thus, the geometry of the holes made by flash lamp pumped lasers has poor machining tolerances and does not allow the flow of a fluid through such holes to be precisely determined.

However, machining holes using a laser device fitted with a Q switch providing trains of pulses of very short length, within the nanosecond range, raises problems of efficiency for machining holes. Indeed, machining holes, particularly of a certain depth, requires a large number of such successive pulses, which limits the machining speed for such holes and thus the industrial yield of such machining. Moreover, this type of laser device is relatively inflexible since it does not enable the profile of the pulses generated by the resonator to be varied to obtain pulses with an intensity profile suited to machining each different type of hole. The machined hole geometry is thus difficult to vary due to the lack of adjustment flexibility of the parameters defining the very short pulses generated by the resonator. Further, holes of a relatively large diameter cannot be machined with pulses in the nanosecond range without using a machining method requiring drilling several holes along a circular outline. Finally, the Q switch frequency is limited because of the formation of a plasma during a short period, the plasma absorbing the luminous energy from a following pulse if it is still present above the hole machining area.

It is an object of the present invention to provide a laser device for drilling holes in fluid injection device components, particularly for fuel, which has good operating stability, a high level of hole machining precision and which allows said holes to be machined at a relatively high speed to obtain a high industrial yield.

It is another object of the invention to provide a device of this type that limits the necessary investment costs while preserving the efficiency thereof.

SUMMARY OF INVENTION

The invention therefore concerns a laser machining device for drilling holes in fluid injection device components, particularly for injecting a fuel into a combustion engine, the machining device comprising a laser resonator formed of a first solid state active medium and first optical pumping means, said first pumping means being formed by laser diodes. Said resonator is arranged for generating primary pulses in the microsecond range. This laser machining device comprises modulation means arranged downstream of said resonator and providing a train of secondary pulses at output for each primary pulse entering therein.

Owing to the features of the laser machining device according to the invention, it is possible to pierce holes efficiently and with great precision, i.e. with low machining tolerances, in fuel injection device components, for example in an injection nozzle or a throttling orifice used for determining the flow rate of a fluid. This device enables primary pulses of relatively long length to be generated, in particular greater than 50 µs. It has been observed that a train of pulses each with a relatively short length, for example between 1 and 20 µs, increases the drilling yield and precision by means of a laser device. However, this efficiency decreases with periodic pulses in the nanosecond range generated by a resonator with a Q switch. In fact, it has been observed within the scope of the present invention that the machining yield for hard materials is lower in the nanosecond range than in the microsecond range. However, the machining precision requires that the energy per pulse must not be increased too much. The device according to the invention generates a second pulse train of this type with an optimum intensity profile owing to the modulation means provided downstream of a laser resonator without a Q switch supplying primary pulses whose energy is greater than that of a secondary pulse. The laser device is thus arranged to provide, in relatively short periods, a relatively large quantity of energy for quickly machining holes while modulating the luminous intensity to obtain precise and clean drilling. Another advantage of the modulated pulses is the optimization of the drilling method relative to the dynamics of the plasma generated by the laser pulses. The primary pulses can be periodically supplied for machining a plurality of holes with a high industrial yield.

The modulation means are for example formed by a Pockels cell. Such cells can be controlled precisely and can also cause the secondary pulse train intensity profile to vary at the output of the cell to optimize the hole drilling efficiency depending on the material in which the holes are made and also depending on geometrical parameters defined for the holes.

It will be noted that the combination of a diode pumped laser resonator providing primary pulses in the microsecond range, in particular of the order of tens or hundreds of microseconds, with means for modulating said primary pulses for varying the temporal distribution of energy by forming a plurality of pulses of shorter periods constitutes a particularly efficient solution, since it adds the advantages of resonator yield and stability to flexibility in the generation of energy distribution reaching the machined material and thus the drilling precision. As a result of the features of the invention, that laser machining device thus allows holes to be machined in a reproducible manner with low tolerances. The device according to the invention is thus particularly well suited to drilling holes of throttling orifices in the components of a fluid injection device or system, in particular a fuel injection device.

BRIEF DESCRIPTION OF THE DRAWING

The laser machining device according to the invention will be described in more detail hereinafter with reference to the annexed drawings, given by way of non-limiting example and in which.

DETAILED DESCRIPTION OF THE ILLUSTRATIVE EMBODIMENTS

Figure 1:
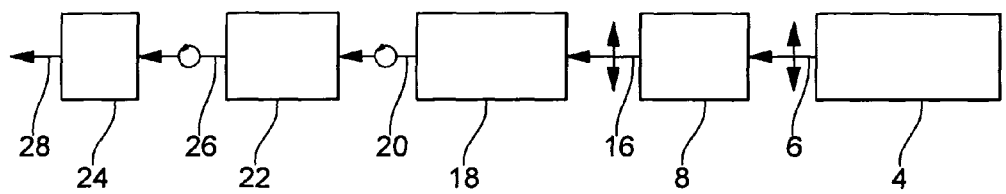
FIG. 1 shows schematically the main elements of a preferred embodiment of the invention.
Figure 2:
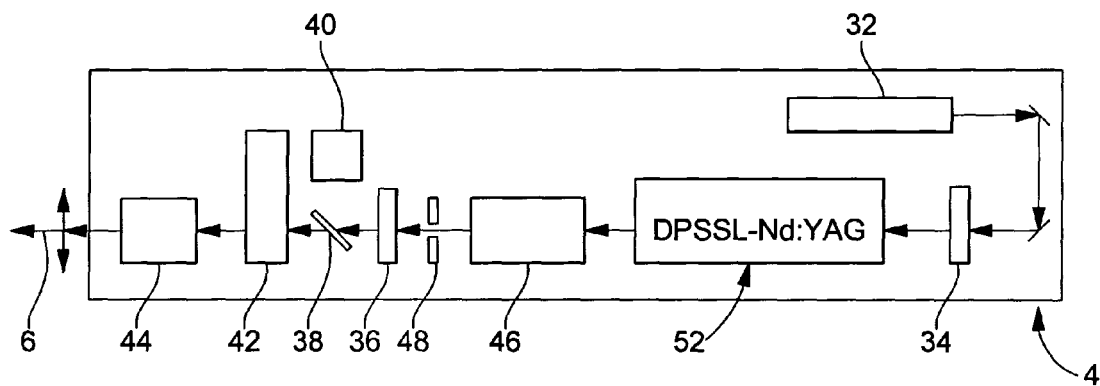
FIG. 2 shows the various elements of a first embodiment of the resonator of the device of FIG. 1.
Figure 3:
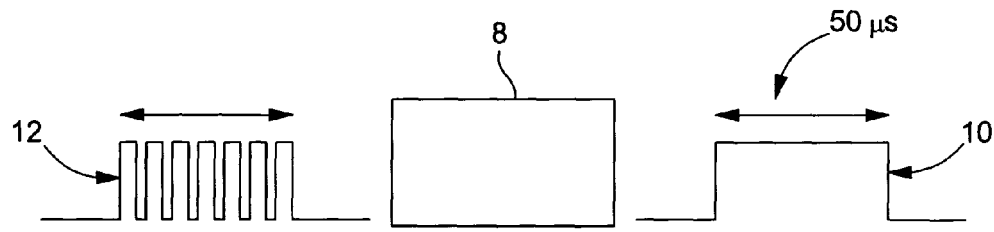
FIG. 3 shows the transformation of the laser beam by the modulation means of the device of FIG. 1.

With reference to FIGS. 1 to 3, a first embodiment of the invention will be described hereinafter. This device comprises a resonator 4 supplying a laser beam 6 having linear polarization. This beam 6 is formed of a succession of primary pulses in the microsecond range. It is provided to modulation means 8 arranged for modulating the incoming laser beam so as to vary the beam intensity distribution, i.e. to vary the power profile thereof so as to form secondary pulse trains of shorter length than the primary pulses supplied by resonator 4. "Pulses in the microsecond range" mean pulses whose length is greater than 1 μs, in particular, between 50 μs and 1 millisecond.

In a preferred variant of the invention, the laser machining device is arranged such that the primary pulses generated by resonator 4 each allow a hole to be made in the machined component. This allows a high industrial yield to be obtained in manufacturing injection device components, without adversely affecting machining precision and the quality of the holes made owing to modulation means 8, in particular formed of a Pockels cell. Moreover, this solution allows a very high energetic yield to be obtained for an active medium formed of an Nd:YAG crystal type diode pumped solid state laser (DPSSL). However, the combination of this type of resonator with modulation means arranged downstream allows secondary pulse trains of shorter length to be obtained, in particular between 1 and 20 μs as is shown in FIG. 3. By way of example, the length of the primary pulses 10 supplied by the resonator is between 50 μs and 1 ms. Pockels cell 8 modulates primary pulse 10 and supplies a secondary pulse train 12 at output, the length of each pulse being comprised between 1 and 20 μs. It should be noted that the Pockels cell can be controlled to precisely define an optimum power profile for the selected application. Thus, power modulation is not necessarily binary, but can vary between a non-zero minimum and given maximum.

Laser beam 16 exiting modulator 8 remains linearly polarized. This beam 16 then enters an optical diode 18 formed, for example, by a linear polarizer and by a quarter-wave plate arranged following the polarizer. Laser beam 20 exiting this optical diode has circular polarization. Beam 20 then enters an amplifier 22 arranged for amplifying the secondary pulse trains 12. Generally, this amplifier is formed by an optically pumped solid state active medium.

Advantageously, it is possible to control the amplification means so as to vary the amplitude of the secondary pulses, at the heart of the same secondary pulse train, by a time lag of the pulse generated in the amplification means with respect to the envelope of the primary pulse entering in this amplification means. The leading or trailing edge of the amplification pulse is thus used to modulate the amplitude of the secondary pulses.

Optical diode 18 is mainly used to protect resonator 4 from reflections from amplifier 22 and also from machining head 24 following the amplifier. Laser beam 26 exiting amplifier 22 is still circularly polarized, as is beam 28 exiting machining head 24.

The machining head comprises focussing means and can also comprise a beam expander preceding the focussing means.

It will be noted that the arrangement of an optical diode in the device of FIG. 1 increases the efficiency of the device and in particular increases the quality of the laser beam supplied. Moreover, this optical diode ensures that the resonator is stable by preventing disturbance and/or interference in the resonant cavity. This thus ensures good reproducibility from one primary pulse to another and thus good reproducibility of the pulse trains supplied by the device at the exit of machining head 24.

Resonator 4 is shown in more detail in FIG. 2. It comprises in a conventional manner a positioning laser 32 for adjusting the position of the resonant cavity elements and also for correctly orienting the part to be machined relative to the laser beam. Next, it comprises in a conventional manner a mirror 34 and a partially reflective mirror 36. It also comprises a beam separator 38 for measuring the energy of the beam using measuring means 40. It further comprises a safety shut-off device 42 and finally an expander 44 for increasing the diameter of the laser beam generated. In the embodiment of FIG. 2, resonator 4 further comprises a linear polarize 46 and a diaphragm 48. The resonator comprises a cavity 52 formed of an Nd:YAG crystal solid state active medium. In the case of the present invention, this active medium is optically pumped by laser diodes arranged in a manner known to those skilled in the art, particularly in the form of a diode bar or matrix.

As mentioned previously, the laser machining device according to the present invention allows a high quality beam to be obtained, suitable for the precise machining of holes in various components, particularly fluid injection device components. This means particularly a beam which is circular, which has substantially constant intensity distribution and which can be precisely focussed with a relatively small focal point diameter. The device also exhibits very good stability. This stability is characterized by low mean power fluctuation, by low resonator-generated primary pulse power variation and finally by low power variation of the secondary pulse train supplied by the laser device, and low secondary pulse train intensity distribution.

The device of the invention generates laser pulses with an energy variation of less than 1%. This means a low machining tolerance relative to the surface of the apertures defined by the holes and thus a low fluid flow variation through the latter.

Microsecond range pulses generated by the resonator are generated for example with a frequency varying between 1 Hz and 1 kHz. The length of each of such pulses varies for example between 10 microseconds (μs) and several milliseconds (ms) whereas the length of the secondary pulses at the modulator output can vary between 1 and 50 μs. Using suitable amplification means which will be described more particularly hereinafter, the supplied pulse peaking capacity can be comprised for example between 100 W and 100 kW. The diameter of the laser beam before the focussing optic is typically less than 50 mm. Given the quality of the laser beam obtained, it is possible to focus it precisely and to adjust the distance of the focal point relative to the components to be machined in a very precise manner, in particular with a tolerance less than 50 μm. It will be noted that precise adjustment of this distance also enables the profile of the machined hole to be defined in accordance with its longitudinal section.

The device according to the invention enables holes with a diameter comprised between 5 μm and 1 mm to be machined. Machining precision is relatively high, i.e. identical holes can be successively machined in a reproducible manner and with low tolerances. A conicity tolerance of less than 5% of the diameter of the hole is obtained. Deformation of the circular profile of the hole is less than 5% of the diameter. The reproducibility of one predefined hole to another can be considerably less than 5%, particularly less than 2%. These very good tolerances result in particular from the use of a resonator formed of a diode pumped solid state laser active medium arranged to provide primary pulses of relatively long length, which are then modulated by modulation means, in particular a Pockels cell, to supply secondary pulse trains whose intensity distribution can be adapted in an optimum manner depending on the drilling dynamics and in particular on the material in which the hole is made, as well as the dimensions of said hole.

Figure 4:
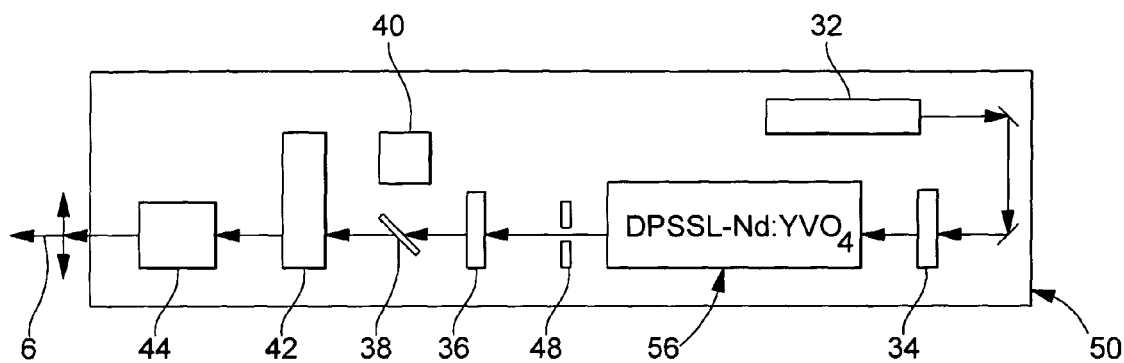
FIG. 4 shows a second embodiment of the resonator of the device of FIG. 1.

FIG. 4 shows a second embodiment of the resonator arranged in the laser machining device of the invention. Those elements that have already been mentioned will not be described again here in detail. Resonator 50 differs essentially from that of FIG. 2 in that the oscillator 56 is formed by a ND:YVO$_4$ crystal. This crystal has the peculiarity of directly supplying a linearly polarized laser beam such that integration of a polarizer in resonator 50 is superfluous. For a certain optical pumping power, this provides a laser beam with a much greater intensity than that supplied by the resonator of FIG. 2, given that the integration of polarizer 46 substantially reduces the luminous intensity provided by half. The use of such a crystal is known for resonators with a Q switch supplying pulses with a very short length, but it has not been proposed by those skilled in the art in a resonator arranged for supplying relatively long pulses, without integration of a Q switch. The use of such a crystal is actually particularly suited to the device of the invention given that the modulation means described hereinbefore generally require linear polarization for the incoming laser beam. It will be noted that those skilled in the art know other crystals having the same property.

As regards polarization, it will also be noted that the arrangement of the various elements provided in the device shown in FIG. 1 allow a circularly polarized laser beam to be obtained at the exit of the machining head, which is particularly suitable for machining holes.

Figure 5:
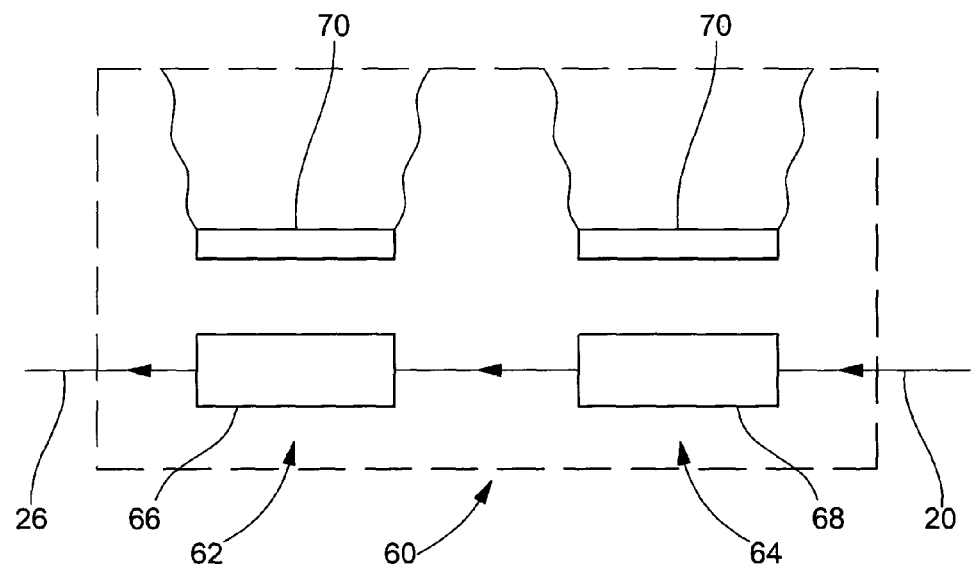
FIG. 5 shows schematically a particular arrangement of the amplification means of the device of FIG. 1.

According to a particular embodiment of the invention, amplification means 22 described hereinbefore are formed of at least two solid state active mediums as shown schematically in FIG. 5. In FIG. 5 laser pulse amplification means 60 are formed of two cavities 62 and 64 each comprising a solid state medium 66, respectively 68, optically pumped by flash lamps 70.

The use of flash lamps in the amplification means constitutes a particular embodiment of the present invention, also in the case where amplification means 22 comprise a single cavity. The main reason for arranging a flash lamp in the amplification means is currently economical. In fact the use of laser diode matrices remains relatively expensive. In the case of the present invention, it was observed that the use of flash lamps in the amplification means had a relatively innocuous influence on the laser beam quality and on the stability of the laser machining device. In fact the use of flash lamps in the amplification means is much less critical than for the resonator in which the laser beams are generated.

Finally, it will be noted that those skilled in the art can provide various arrangements for the amplification means for obtaining several amplification levels for the laser beam. Associated with other optical elements, it is possible to envisage embodiments in which the laser beam passes at least twice in each cavity. Moreover, it is to be noted that within the scope of the present invention as claimed, the optical state of the amplifier can also be pumped by laser diodes.

The invention claimed is:

1. A laser machining device for drilling holes in fluid injection device components, particularly for injecting fuel into a combustion engine, said machining device comprising:
    (a) a laser resonator formed of a first solid state active medium and first optical pumping means, wherein said first optical pumping means is formed by laser diodes and said resonator generates, without a Q switch, primary pulses having a length within or greater than the microsecond range; and
    (b) modulation means arranged between said resonator and a machining head, wherein said modulation means receives primary pulses from said resonator and operates to output a train of secondary pulses for each primary pulse entering therein from said resonator, and each secondary pulse has a shorter length than the corresponding primary pulse.

2. The laser machining device according to claim 1, further comprising an optical diode arranged downstream of said resonator.

3. The laser machining device according to claim 1, further comprising means for amplifying the pulses supplied by said resonator.

4. The laser machining device according to claim 2, further comprising means for amplifying the laser pulses supplied by said resonator, said amplification means being arranged downstream of said optical diode.

5. The laser machining device according to claim 2, wherein said optical diode is formed by a linear polarizer and by a quarter-wave plate arranged following said polarizer.

6. The laser machining device according to claim 4, wherein said optical diode is formed by a linear polarizer and by a quarter-wave plate arranged following said polarizer.

7. The laser machining device according to claim 3, wherein said amplification means are controlled so that amplification pulses are provided with a time lag relative to the primary pulses so that the amplitude of said secondary pulses is modulated.

8. The laser machining device according to claim 4, wherein said amplification means are controlled so that amplification pulses are provided with a time lag relative to the primary pulses so that the amplitude of said secondary pulses is modulated.

9. The laser machining device according to claim 3, wherein said amplification means include a cavity formed by a second solid state active medium and by second optical pumping means formed by a flash lamp.

10. The laser machining device according to claim 7, wherein said amplification means include several active mediums defining several amplification levels, each of said active mediums being pumped by a flash lamp.

11. The laser machining device according to claim 1, wherein said resonator is arranged for supplying at the outlet thereof a linearly polarized laser beam.

12. The laser machining device according to claim 10, wherein said first active medium is formed by a crystal selected from among crystals that directly generate a linearly polarized light.

13. The laser machining device according to claim 1, wherein said resonator supplies primary pulses in the microsecond range having an energy such that a hole is drilled in a given component by a single primary pulse generated by said resonator.

14. The laser machining device according to claim 1, wherein each of the primary pulses has a length between fifty microseconds (50 μs) and one millisecond (1 ms).

15. The laser machining device according to claim 1, wherein each of the secondary pulses has a length between one microsecond (1 μs) and twenty microseconds (20 μs).

16. The laser machining device according to claim 14, wherein each of the secondary pulses has a length between one microsecond (1 μs) and twenty microseconds (20 μs).

17. The laser machining device according to claim 1, wherein said modulation means comprises a Pockels cell.

18. A laser machining device for drilling holes in fluid injection device components, particularly for injecting fuel into a combustion engine, said machining device comprising:
(a) a laser resonator formed of a first solid state active medium and first optical pumping means, wherein said first optical pumping means is formed by laser diodes and said resonator generates, without a Q switch, primary pulses having a length within or greater than the microsecond range;
(b) modulation means arranged between said resonator and a machining head, wherein said modulation means receives primary pulses from said resonator and operates to output a train of secondary pulses for each primary pulse entering therein from said resonator, and each secondary pulse has a shorter length than the corresponding primary pulse; and
(c) means for amplifying the pulses supplied by said resonator, wherein said amplification means are controlled so that amplification pulses are provided with a time lag relative to the primary pulses so that the amplitude of said secondary pulses is modulated, and wherein said amplification means include several active mediums defining several amplification levels, wherein each of said active mediums is pumped by a flash lamp, wherein said first active medium is formed by a Nd:YVO$_4$ crystal that directly generates a linearly polarized light.

* * * * *